United States Patent [19]

Pool et al.

[11] 4,273,444
[45] Jun. 16, 1981

[54] INTERFEROMETER GYROSCOPE HAVING RELAXED DETECTOR LINEARITY REQUIREMENTS

[75] Inventors: Robert H. Pool, Marion; Glenn W. Sellers, Cedar Rapids, both of Iowa

[73] Assignee: Rockwell International Corporation, El Segundo, Calif.

[21] Appl. No.: 48,207

[22] Filed: Jun. 13, 1979

Related U.S. Application Data

[63] Continuation-in-part of Ser. No. 962,519, Nov. 20, 1978, abandoned.

[51] Int. Cl.$^3$ .................................................. G01C 19/64
[52] U.S. Cl. .................................................. 356/350
[58] Field of Search ............................... 356/350, 351

[56] References Cited
PUBLICATIONS

Davis et al; SPIE vol. 157, Laser Inertial Rotation Sensors, (1978), pp. 131–136; Paper Presented; Society of Photo-Optical Inst. Engineers, San Diego Conference 30 & 31, Aug. 1978.

*Primary Examiner*—Vincent P. McGraw
*Attorney, Agent, or Firm*—Richard A. Bachand; H. Fredrick Hamann

[57] ABSTRACT

Interferometer gyro includes a source of light which is divided into two portions. Each of the two portions is modulated with a respective frequency, one being a fixed frequency and the other being a variable frequency. The modulated light portions are then introduced into a fiber optic coil, the rotation of which about an axis of sensitivity is desired to be measured. After the light portions have traversed the optical fiber, they are each again modulated by the respective other frequency, then compared to produce a signal indicating the phase difference therebetween. The phase difference signal is integrated to produce a signal for varying the variable frequency such that the phase difference produced is null. The rate of rotation of the optic fiber about its axis of sensitivity is then determined by the comparison of the fixed and variable frequencies.

7 Claims, 1 Drawing Figure

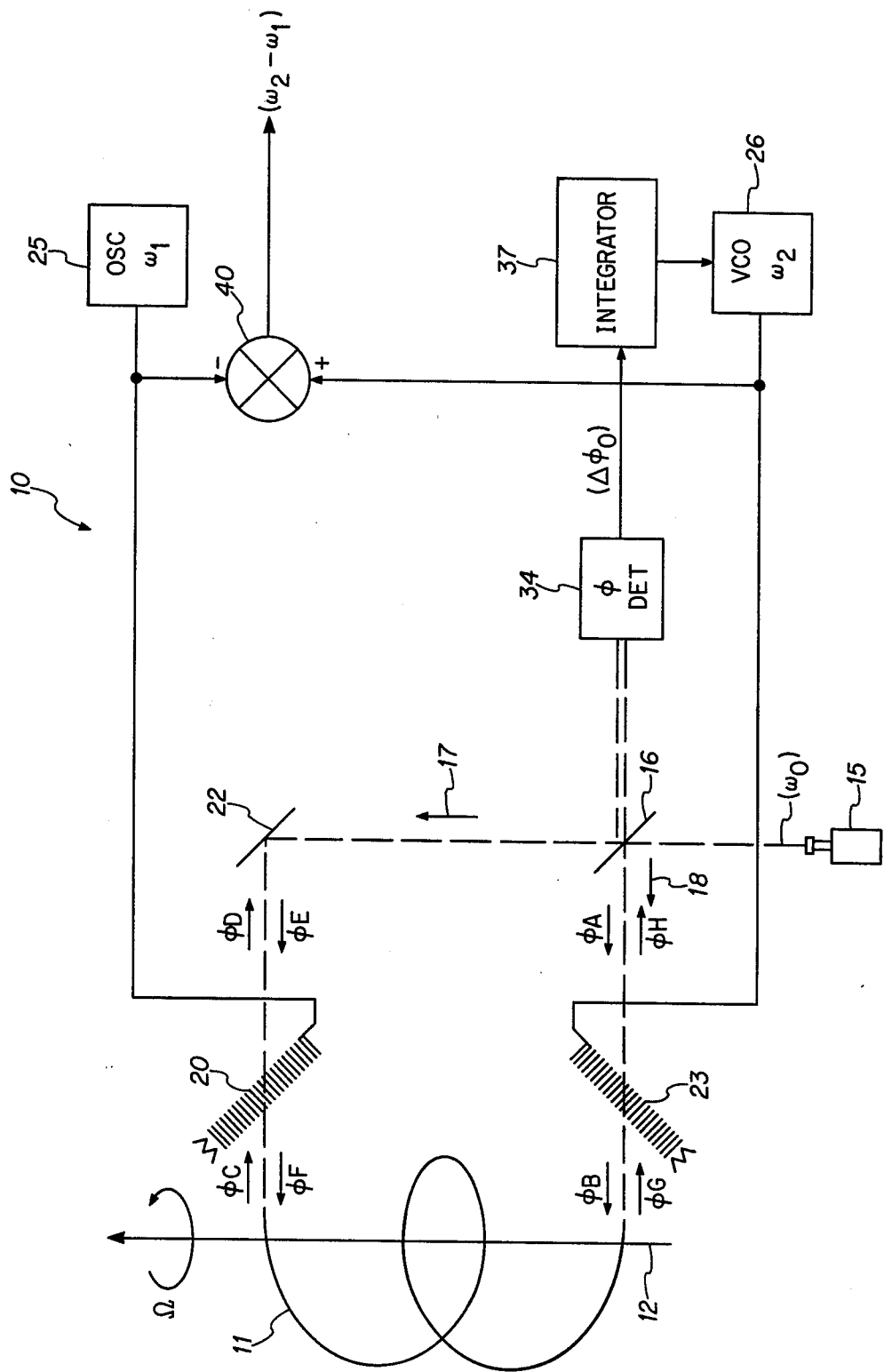

INTERFEROMETER GYROSCOPE HAVING RELAXED DETECTOR LINEARITY REQUIREMENTS

CROSS REFERENCE TO RELATED APPLICATION

This application is a continuation-in-part of copending patent application Ser. No. 962,519, filed Nov. 20, 1978 now abandoned.

BACKGROUND OF THE INVENTION

1. Field of the Invention

This invention relates to improvements in interferometer gyroscopes, and, more particularly, to improvements in interferometer gyroscopes of the type in which a phase difference between counter-rotating light beams modulated with known frequencies is developed to determine the rotation of the optical path through which the beams traverse.

2. Description of the Prior Art

In the advance of interferometer gyroscope, or gyro, art, interferometer gyros have been proposed using a light path formed of a ring of fiber optic material through which counter-rotating light components travel. One such gyro is described in U.S. patent application Ser. No. 936,680 filed Aug. 23, 1978, assigned to the assignee of the present invention and incorporated herein by reference. In that application, a light beam from a light source, such as a source of laser or coherent light, is divided, and signals of first and second frequencies are impressed or modulated onto respective ones of the divided components. The modulated signals are introduced into the fiber ring in opposite or counter-rotating directions, then detected after each has traversed the length of the ring. The phase difference between the two detected components is then measured as an indication of the rotation of the fiber ring. The principle upon which the operation of the gyroscope is based is as described in U.S. Pat. No. 4,013,365; namely, that as the optical path is rotated and its apparent length is increased as seen by the light traveling in the direction of rotation, and is decreased as seen by the light traveling in the opposite direction. The increased and decreased apparent optical path lengths result in a phase change of equal but opposite amount upon the light in traversing the optical fiber ring.

One of the problems which has been found in the gyros of the prior art, especially for application in inertial grade apparatuses, is that it is difficult to achieve a sufficient dynamic phase detection range with linearity over the wide range of rotation rates anticipated; for example, rotation rates may range from $3 \times 10^{-6}$ degrees per second to 300 degrees per second for a typical inertial navigation system sensor.

One laser gyroscope for measurement of inertial rotation is described by S. Ezekiel and S. R. Balsamo in an artical entitled "Passive Ring Resonator Laser Gyroscope" in applied *Physics Letters,* Volume 30, No. 9, page 478 on May 1, 1977. Ezekiel and Balsamo describe a system which employs two independently controlled laser frequencies to measure the clockwise and counterclockwise resonant frequencies of the passive ring. The light from a laser light source is divided and modulated by acousto-optic crystals in each path to produce a first light beam at frequency $f_0 + f_1$ and a second light beam of frequency $f_0 + f_2$. The frequency $f_2$ is controlled through a feedback path to maintain the maximum output light detector. The frequency $f_2$, however, is adjusted outside the loop which forms the passive ring. This, therefore, results in a system in which changes affecting one of the counter rotating light beams may not affect the other and, therefore, may result in measurement error.

BRIEF DESCRIPTION OF THE INVENTION

In light of the above, it is, therefore, on object of the invention to provide an interferometer gyroscope.

It is another object of the invention to provide an interferometer gyroscope of the type described in which the output is unaffected by nonlinear characteristics of various elements in the gyro circuitry, in general, and by nonlinear responses by the phase detector, in particular.

It is yet another object of the invention to provide a fiber ring interferometer gyroscope of the type described having improved linearity and dynamic range.

It is still another object of the invention to provide a fiber ring interferometer which is relatively unaffected by temperature changes to which it may be exposed.

It is still another object of the invention to provide a fiber ring interferometer of the type described which produces an output which is in a useful form for use as an avionics sensor.

These and other objects, features and advantages will become apparent to those skilled in the art from the following detailed description when read in conjunction with the accompanying drawings and appended claims.

In its broad aspect, the interferometer gyro of the invention includes a source of light and first and second means for modulating respectively a fixed frequency onto a first portion of the light of the light source and for modulating a variable frequency onto a second portion of the light source. A light path is provided which has an axis of sensitivity the rotation about which is desired to be measured. The light path is disposed in a manner whereby the modulated first component traverses the light path in one direction and the second modulated component traverses the light path in an opposite direction. The first and second modulating means are each operative upon a respective one of the first and second light portions before it has traversed the light path and a respective other of the light portions after it has traversed the light path to affect both in the same manner. Means are provided for producing a signal representing the phase difference between the first and second modulated portions introduced by the rotation of the light path about the axis of sensitivity as the first and second portions traverse the light path. Means are also provided for integrating the phase difference representing signal. The integrating means is operative to change the variable frequency to produce a null phase difference representing signal. Thus, the difference between the fixed and variable frequencies represents the rate of rotation of the light path about the axis of sensitivity.

BRIEF DESCRIPTION OF THE DRAWING

The invention is illustrated in the accompanying drawing, wherein the sole FIGURE of the drawing is a diagrammatic and schematic illustration of the interferometer in accordance with the principles of the invention.

DETAILED DESCRIPTION OF THE PREFERRED EMBODIMENTS

The interferometer gyro in accordance with the invention is illustrated in the sole accompanying drawing and is designated generally by the reference numeral 10. The gyro 10 employs a length of fiber optic material 11 formed in a coil symmetrically about an axis of sensitivity 12 about which rotation is desired to be measured. The fiber optic material can be of most commercially available types, but preferably should be a single mode fiber of length of, for instance, approximately one kilometer. The fabrication techniques of the fiber and its physical configuration are not an essential part of the present invention, as a variety of fiber types, and for that matter, other optical path configurations utilizing mirrors, reflective surfaces, or the like may be equally advantageously employed, as will be apparent to those skilled in the art.

Light from a laser source 15 is divided by a beam splitter 16 into two components, as designated by arrows 17 and 18. The component 17 is directed through an acousto-optic modulator 20 and introduced into the optical fiber 11 in a first direction. The beam 18, on the other hand is directed through a second acousto-optic modulator 23 to be introduced into the optic fiber 11 in an opposite direction from that of the component 17. The acousto-optic modulators 20 and 23 can be any such devices known in the art to modulate a light beam, such as electro-optic modulators, and the like. All are intended to be encompassed by the term "acousto-optic modulator". The one constraint on such modulator is that the light must be passable in either forward or reverse directions therethrough, whereby, in accordance with the principles of the invention, both light beams are acted upon by the modulator, one in a forward direction and the other in a reverse direction.

The acousto-optic modulator 20 is driven by an oscillator 25 at a first fixed frequency, designated by $\omega_1$. In like fashion, the acousto-optic modulator 23 is driven by a VCO 26 at a variable frequency $\omega_2$. Thus, the light component 17 introduced into the optic fiber 11 in the counterclockwise direction illustrated is of frequency $\omega_0$ (the original laser frequency) plus $\omega_1$ (the fixed oscillator frequency). The component 18 introduced into the optic fiber in the clockwise direction, on the other hand, is a frequency $\omega_0$ (the original laser frequency) plus $\omega_2$ (the frequency of the VCO 26).

Each light component after traveling through the optic fiber 11, passes through the respective other acousto-optic modulator in a reverse direction, and is removed from the optic path by respective reflective surfaces 22 and 16. Thus, the modulated light component 18 traveling the fiber optic in a clockwise direction is modulated by the fixed frequency $\omega_1$ by the acousto-optic modulator 20 and deflected onto a phase detector 34. Similarly, the light component 17 after traversing the optic fiber 11 is modulated by the variable frequency $\omega_2$ by the acousto-optic modulator 23 and directed through the partially reflective surface 16 onto the phase detector 34. The two light components described combine upon the phase detector 34 to form an interference pattern, and the phase detector 34 produces an output signal, indicated by $\Delta\phi_0$, indicative of the phase difference between the two components. The output of the phase detector 34 is an electrical output for delivery to an integrator 37. The integrator 37 integrates the output signal from the detector 34 and delivers the integrated signal to the VCO 26 to control the frequency $\omega_2$ generated thereby. The output of the VCO 26 is compared with the fixed frequency output of the oscillator 25 by a mixer 40 to produce an output which, as will be further discussed below, represents the angular rotation of the optic fiber 11 about the axis of sensitivity 12.

In the embodiment illustrated, two key features should be particularly noted. First, both of the components 17 and 18 traverse both of the acousto-optic modulators 20 and 23. Thus, any distortion or non-linear components affecting either of the light components will affect the other, as well. Second, the feedback system of the invention modifies the phase which is detected at the phase detector 34 to produce a null, by varying the frequency which is modulated onto the second component 18. Thus the linearity requirements heretofore required of the phase detector are greatly relaxed, if not totally eliminated.

The recognition that the phase of the output delivered to the phase detector 34 can be modified by varying the frequency of the VCO 26 can be appreciated from the following equations, each representing the phase at the designated points, wherein: $\phi_X$ represents the overall phase at the points designated by the subscript letters A-H in the drawing $\omega_0$ represents the frequency of the laser source 15, $\omega_1$ represents the fixed frequency of the oscillator 25, $\omega_2$ represents the variable frequency of the VCO 26, $\tau_0$ represents the phase delay introduced onto a peculiar light component in the traversal of the length of the optic fiber 11, and $\Delta\tau$ represents the phase delay introduced onto a peculiar light component by virtue of the rotation of the optic fiber 11 about its axis of sensitivity 12.

$$\phi_A = \omega_0 t$$

$$\phi_B = \omega_0 t + \omega_2 t$$

$$\phi_C = \omega_0 t + \omega_2 t - \omega_0(\tau_0 - \Delta\tau) - \omega_2(\tau_0 - \Delta\tau)$$

$$\phi_D = \omega_0 t + \omega_1 t + \omega_2 t - \omega_0(\tau_0 - \Delta\tau) - \omega_2(\tau_0 - \Delta\tau)$$

$$\phi_E = \omega_0 t$$

$$\phi_F = \omega_0 t + \omega_1 t$$

$$\phi_G = \omega_0 t + \omega_1 t - \omega_0(\tau_0 + \Delta\tau) - \omega_1(\tau_0 + \Delta\tau)$$

$$\phi_H = \omega_0 t + \omega_1 t + \omega_2 t - \omega_0(\tau_0 + \Delta\tau) - \omega_1(\tau_0 + \Delta\tau)$$

In operation, the output of the phase detector 34 is maintained at zero or null. Therefore, upon rotation of the optic fiber 11 about its axis of sensitivity 12, the frequency of the VCO 26 is changed in order to maintain the output of the phase detector 34 at zero. The difference, therefore, between the fixed frequency $\omega_1$ and the variable frequency $\omega_2$ represents the angular rotation rate of the fiber, as demonstrated by the following.

The output of the phase detector is $$\Delta\phi_o = K(\phi_D - \phi_H) \text{ [} K \text{ being a scale or gain factor]}$$
$$= K(\omega_0(2\Delta\tau) - (\omega_2 - \omega_1)\tau_o + (\omega_1 + \omega_2)\Delta\tau]$$
$$= 0$$

With the phase detector output, $\Delta\phi_0$, maintained at zero, the gain factor K has no effect.

The interferometer output, $(\omega_2 - \omega_1)$, can be determined from this equation to be $$(\omega_2 - \omega_1) = \omega_o \frac{(2\Delta\tau)}{\tau_o} + \frac{(\omega_1 + \omega_2)}{2} \frac{(2\Delta\tau)}{\tau_o}$$

The last term $$\frac{(\omega_1 + \omega_2)}{2} \frac{(2\Delta\tau)}{\tau_o}$$

is an error term; however, the frequency involved in this error term, $(\omega_1+\omega_2/2)$, will always be about six orders of magnitude less than the optical frequency, $\omega_0$. Therefore the contribution of this error term can reasonably be considered negligible allowing this equation to be written as $$(\omega_2 - \omega_1) = \omega_o \frac{(2\Delta\tau)}{\tau_o} = \frac{1}{\tau_o} [\frac{4\pi Lr}{c\lambda} \Omega],$$

where L is the length of the optic fiber, in meters; r is the radius of the coil of the optic fiber, in meters; c is the speed of light, in meters per second; $\Omega$ is the angular rate of rotation of the optic fiber 11, in radians per second; and $\lambda$ is the wavelength of the optical signal, in meters.

Since the invention has been described and illustrated with a certain degree of particularity, it is understood that the present disclosure is made by way of example only and that numerous changes in the combination and arrangement of parts may be restored to by those skilled in the art without departing from the spirit and scope of the invention as hereinafter claimed.

We claim:
1. An interferometer gyro, comprising:
a source of light;
first means for modulating a fixed frequency onto a first portion of the light of said source of light;
second means for modulating a variable frequency onto a second portion of the light of said source of light;
a light path having an axis of sensitivity, the rotation of said light path about which is desired to be measured disposed whereby said modulated first component traverses said light path in one direction and said second modulated component traverses said light path in an opposite direction;
said first and second modulating means each being operative upon a respective one of said first and second light portions before it has traversed said light path and a respective other of said light portions after it has traversed said light path;
means for producing a signal representing the phase difference between said first and second modulated portions introduced by the rotation of said light path about said axis of sensitivity as said first and second portions traverse said light path;
and means for integrating said phase difference representing signal, operative to change said variable frequency to produce a null phase difference representing signal, whereby the difference between said fixed and variable frequencies represents the rate of rotation of said light path about said axis of sensitivity.

2. The interferometer gyro of claim 1 wherein said light path comprises an optical fiber.

3. The apparatus of claims 1 or 2 wherein said source of light comprises a laser which produces a coherent light beam.

4. The interferometer of claim 1 wherein said means for modulating a fixed frequency onto said first portion comprises an acousto-optic modulator and an oscillator having a fixed frequency output connected to said acousto-optic modulator; and wherein said means for modulating a variable frequency onto said second portion comprises a second acousto-optic modulator and a variable frequency oscillator having an output connected to said second acousto-optic modulator.

5. An interferometer gyro comprising:
a light path having an axis of sensitivity, the rotation about which is desired to be measured;
a source of light having two components, each introduced into said light path to traverse it in a respective opposite direction;
first means for modulating a fixed frequency onto one of said two light components prior to its introduction into said light path and onto another of said two light components after it has traversed said light path;
second means for modulating a variable frequency onto said another of said two light components prior to its introduction into said light path and onto said one of said two light components after it has traversed said light path;
means for producing a signal indicating the phase difference between said modulated components introduced by the rotation of said light path about said axis of sensitivity as said two components traverse said light path;
and feedback means for controlling the variable frequency of said second modulating means in accordance with said phase difference indicating signal to minimize said phase difference indicating signal;
whereby the rate of rotation about said axis of sensitivity is indicated by the frequency difference between the fixed and variable frequencies of said first and second modulating means when said phase difference indicating signal is minimized.

6. The interferometer gyro of claim 5 wherein said light path comprises an optic fiber coiled about the axis of sensitivity.

7. The interferometer gyro of claims 5 or 6 wherein said feedback means comprises an integrator to receive the output of said means for producing a phase difference indicating signal, an output of said integrator providing a signal for controlling the variable frequency of said second modulating means.

* * * * *